United States Patent
Engler et al.

(10) Patent No.: US 9,720,441 B1
(45) Date of Patent: Aug. 1, 2017

(54) GENERATING TIME-OF-DAY VALUES WITHOUT CAUSING EXECUTION STALLS

(71) Applicant: International Business Machines Corporation, Armonk, NY (US)

(72) Inventors: Eberhard Engler, Tuebingen (DE); Christian Jacobi, West Park, NY (US); Martin Recktenwald, Schoenaich (DE); Timothy J. Slegel, Staatsburg, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 15/282,224

(22) Filed: Sep. 30, 2016

(51) Int. Cl.
- *G06F 1/12* (2006.01)
- *G06F 1/14* (2006.01)
- *G06F 15/16* (2006.01)
- *G06F 15/163* (2006.01)
- *G06F 15/167* (2006.01)

(52) U.S. Cl.
CPC .......... *G06F 1/12* (2013.01); *G06F 1/14* (2013.01); *G06F 15/163* (2013.01); *G06F 15/167* (2013.01)

(58) Field of Classification Search
CPC . G06F 1/12; G06F 1/14; G06F 15/163; G06F 15/167
See application file for complete search history.

(56) References Cited

U.S. PATENT DOCUMENTS

| | | | |
|---|---|---|---|
| 7,330,488 B2 | 2/2008 | Craddock et al. | |
| 7,453,910 B1 * | 11/2008 | Biberstein | G06F 1/12 370/503 |
| 7,617,410 B2 | 11/2009 | Check et al. | |
| 8,700,943 B2 * | 4/2014 | Dixon | G06F 1/14 713/300 |
| 8,881,114 B2 * | 11/2014 | Sohm | G06F 11/3471 717/128 |
| 9,207,706 B2 | 12/2015 | Gerwig et al. | |
| 9,541,949 B2 * | 1/2017 | Kuzi | G06F 1/14 |
| 2009/0259875 A1 | 10/2009 | Check et al. | |
| 2012/0173917 A1 | 7/2012 | Engler et al. | |

OTHER PUBLICATIONS

Materialize Time of Day Clock Attributes (MATTODAT); IBM Knowledge Center; https://www.ibm.com/support/knowledgecenter/ssw_i5_54/rzatk/MATTODAT.html; accessed Sep. 30, 2016; 4 pages.

* cited by examiner

*Primary Examiner* — Stefan Stoynov
(74) *Attorney, Agent, or Firm* — Cantor Colburn LLP; Steven Chiu

(57) ABSTRACT

A system and method for generating a timestamp without processor core execution stall are provided. For example, the method includes generating, using a first processor core, a timestamp. The method also includes preventing, using the first processor core, a second processor core from accessing the timestamp for a minimum time granularity interval. The time granularity interval provides a delay such that the timestamp generated by the first processor core is earlier in time than a second processor core timestamp.

20 Claims, 8 Drawing Sheets

GENERATING TIME-OF-DAY VALUES WITHOUT CAUSING EXECUTION STALLS

BACKGROUND

The subject matter disclosed herein generally relates to timestamps and, more particularly, to synchronizing timestamps to avoid execution stalls in processor cores.

Programs often need access to a clock. For example, besides being used to determine the actual time of day, the clock can also be used to order a sequence of events, such as e.g. financial transactions. To allow a clock to be used in that way, the clock has to keep running "forward," i.e. two reads of the clock never result in the same value, and the "later" clock read has to generate a later (larger) clock value.

In processor architecture, such a clock can be defined as a binary value, e.g. a 64-bit value, where a certain bit position defines a known fixed timed increment. For example, bit 32 could be defined as a one second time increment. More significant bits would indicate larger time increments, while less significant bits smaller increments.

In a multicore system that includes a plurality of processing cores, it is possible for more than one core to simultaneously generate a timestamp with the same time value. Further, other timestamp generation issues can arise when processor cores generate timestamps within close time proximity of each other without taking into account storing and retrieving time requirements. Accordingly, to make sure that a timestamp is correctly generated, a processor core may request a timestamp from shared memory and will stall execution until the requested timestamp is received. Once received, the timestamp generated and the retrieved timestamp value can be resolved through adjustment and delay. However, such an execution stall of a processor core, because of timestamp issues, can cause time delays and therefore loss of performance and execution speed of the core and overall system and processes being executed.

Accordingly, improvements to the system and/or method for handling timestamps are desired.

BRIEF DESCRIPTION

According to one embodiment a method for generating a timestamp without processor core execution stall is provided. The method includes generating, using a first processor core, a timestamp. The method also includes preventing, using the first processor core, a second processor core from accessing the timestamp for a minimum time granularity interval. The time granularity interval provides a delay such that the timestamp generated by the first processor core is earlier in time than a second processor core timestamp.

In addition to one or more of the features described above, or as an alternative, further embodiments may include wherein the minimum time granularity interval is equal to a time for the least significant time bit of the timestamp to turn over.

In addition to one or more of the features described above, or as an alternative, further embodiments may include wherein preventing the second processor core from viewing the timestamp includes stalling a storing of the timestamp into a shared memory for the minimum time granularity interval equal to a time for the least significant time bit of the timestamp to turn over.

In addition to one or more of the features described above, or as an alternative, further embodiments may include wherein preventing the second processor core from viewing the timestamp includes storing the timestamp to a shared memory, and blocking access to a stored timestamp for the minimum time granularity interval that is equal to a time for the least significant time bit of the timestamp to turn over.

In addition to one or more of the features described above, or as an alternative, further embodiments may include wherein blocking access to the stored timestamp includes holding ownership of a shared memory location that has the generated timestamp until the minimum time granularity interval passes.

In addition to one or more of the features described above, or as an alternative, further embodiments may include retrieving, at a second processor core, the timestamp generated and stored by the first processor core.

In addition to one or more of the features described above, or as an alternative, further embodiments may include wherein stalling the storing of the timestamp includes marking the timestamp with a value that indicates the timestamp is to be stalled until the minimum time granularity interval passes before storing, detecting if the timestamp is marked, and stalling the storing of the timestamp when the timestamp is detected as being marked.

In addition to one or more of the features described above, or as an alternative, further embodiments may include removing the marking when the minimum time granularity interval passes.

In addition to one or more of the features described above, or as an alternative, further embodiments may include wherein the first processor core continues executing during the minimum time granularity interval.

In addition to one or more of the features described above, or as an alternative, further embodiments may include wherein generating the timestamp includes fetching a current time of day (TOD) value that includes a least significant time bit as a least significant bit, and merging a CPU identification (ID) value with the TOD value.

In addition to one or more of the features described above, or as an alternative, further embodiments may include, wherein merging the CPU ID value with the TOD value, further includes appending the CPU ID value bits to the TOD value as the least significant bits.

In addition to one or more of the features described above, or as an alternative, further embodiments may include, wherein the minimum time granularity interval is equal to the time is takes for the least significant bit of the TOD value to turn over.

According to an embodiment a system for generating a timestamp without processor core execution stall is provided. The system includes a shared memory having computer readable instructions. The system also includes a first processor core configured to execute the computer readable instructions. The computer readable instructions include generating, using the first processor core, a timestamp, preventing, using the first processor core, a second processor core from accessing the timestamp for a minimum time granularity interval, and retrieving, at a second processor core, the timestamp generated and stored by the first processor core after the minimum time granularity interval passes. The minimum time granularity interval is equal to a time for the least significant time bit of the timestamp to turn over.

In addition to one or more of the features described above, or as an alternative, further embodiments may include, wherein preventing the second processor core from viewing the timestamp includes stalling a storing of the timestamp into the shared memory for the minimum time granularity interval equal to a time for the least significant time bit of the timestamp to turn over.

In addition to one or more of the features described above, or as an alternative, further embodiments may include, wherein preventing the second processor core from viewing the timestamp includes storing the timestamp to the shared memory, and blocking access to a stored timestamp for the minimum time granularity interval that is equal to a time for the least significant time bit of the timestamp to turn over by holding ownership of a shared memory location that has the generated timestamp until the minimum time granularity interval passes.

In addition to one or more of the features described above, or as an alternative, further embodiments may include, wherein stalling the storing of the timestamp includes marking the timestamp with a value that indicates the timestamp is to be stalled until the minimum time granularity interval passes before storing, detecting if the timestamp is marked, stalling the storing of the timestamp when the timestamp is detected as being marked, and removing the marking when the minimum time granularity interval passes.

In addition to one or more of the features described above, or as an alternative, further embodiments may include, wherein generating the timestamp includes fetching a current time of day (TOD) value that includes a least significant time bit as a least significant bit, and merging a CPU identification (ID) value with the TOD value by appending the CPU ID value bits to the TOD value as the least significant bits. The minimum time granularity interval is equal to the time is takes for the least significant bit of the TOD value to turn over.

According to an embodiment a computer program product for generating a timestamp without processor core execution stall is provided. The computer program product including a computer readable storage medium having program instructions embodied therewith. The program instructions executable by a plurality of processor cores that includes a first processor core and a second processor core to cause the plurality of processor cores to generate, using the first processor core, a timestamp, prevent, using the first processor core, a second processor core from accessing the timestamp for a minimum time granularity interval, and retrieve, at the second processor core, the timestamp generated and stored by the first processor core after the minimum time granularity interval passes. The minimum time granularity interval is equal to a time for the least significant time bit of the timestamp to turn over.

In addition to one or more of the features described above, or as an alternative, further embodiments may include stalling the storing of the timestamp into a shared memory for the minimum time granularity interval equal to a time for the least significant time bit of the timestamp to turn over.

In addition to one or more of the features described above, or as an alternative, further embodiments may include storing the timestamp to the shared memory, and blocking access to the stored timestamp for the minimum time granularity interval that is equal to a time for the least significant time bit of the timestamp to turn over by holding ownership of a shared memory location that has the generated timestamp until the minimum time granularity interval passes.

The foregoing features and elements may be combined in various combinations without exclusivity unless expressly indicated otherwise. These features and elements, as well as the operation thereof, will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
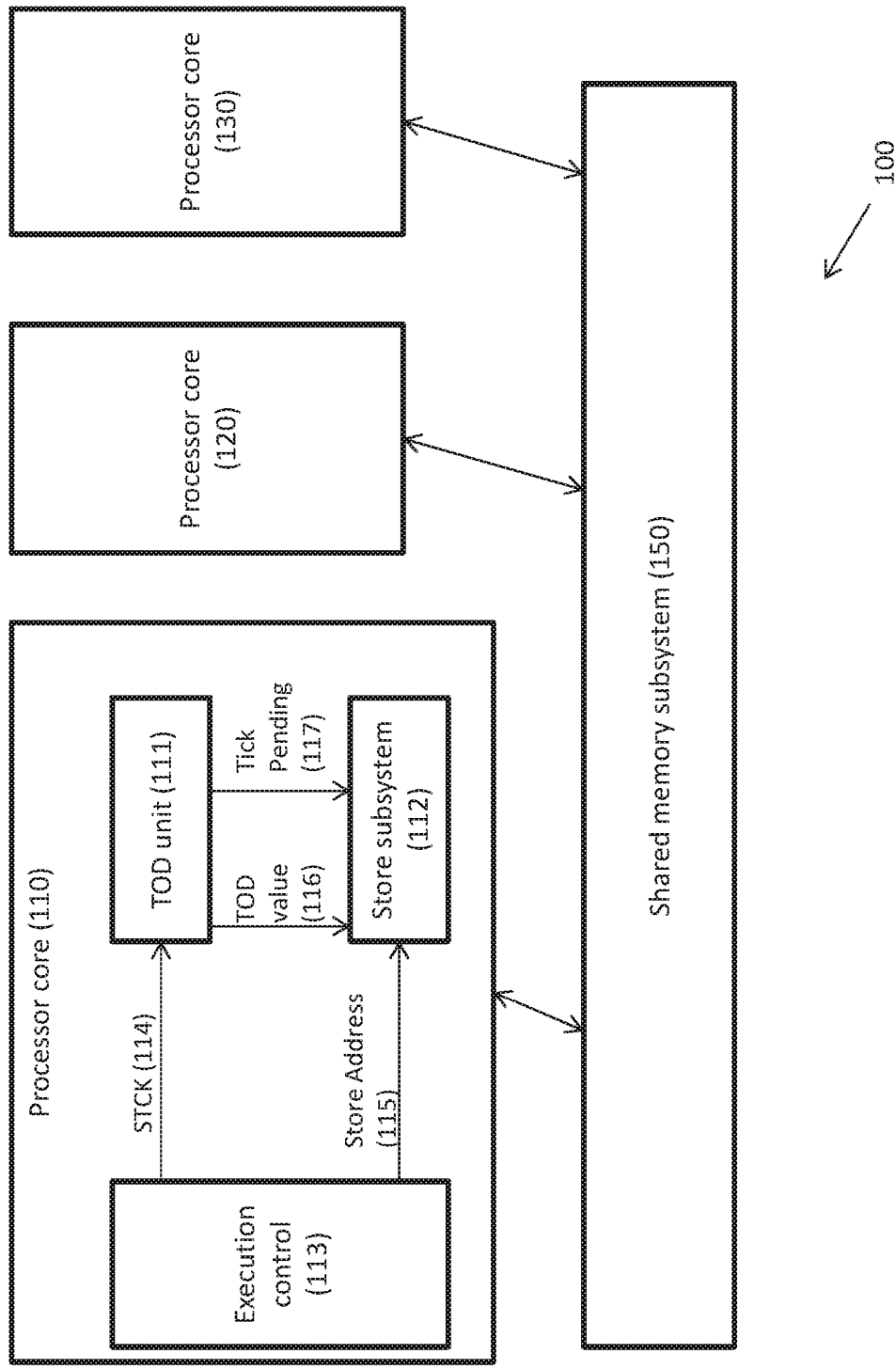
FIG. 1 is a block diagram of a system for generating a timestamp without processor core execution stall in accordance with one or more embodiments.

A detailed description of one or more embodiments of the disclosed apparatus and method are presented herein by way of exemplification and not limitation with reference to the Figures.

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

Embodiments described herein are directed to providing strictly monotonically increasing clock values for a computer system with a large number of processor cores. The clock values, also called timestamps, are provided such that no execution stall is caused in a sending processor core due to the value of the timestamp. This is provided by including a handling property that allows for fast generation of clock values, without having to stall program execution.

For example, in accordance with one or more embodiments, a system and method for generating timestamps that include a time-of-day (TOD) value without causing execution stalls are provided. In one or more embodiments, the TOD is a fixed-width binary value, with multiple synchronized copies distributed throughout the system. Additionally, the timestamp further includes a core ID as part of the timestamp in addition to the TOD value. According to one or more embodiments, the inclusion of the core ID along with TOD value provides a unique value even in the event that different cores happen to generate a TOD value at the same time. This is because the core ID value would be different for each core making the overall timestamp value different even when the TOD values are the same. Further, in one or more embodiments, including the core ID can help provide strictly monotonic TOD values. In accordance with one or more embodiments, instead of stalling the TOD access because another processor core could already have generated large (i.e., "later") TOD value, the processor core's normal store handling is modified to prevent the other core from observing a potentially newer TOD value. This can be done, for example, by indicating to the store control logic that a TOD value is not "safe" to be seen by other processor cores because it could be considered "newer" than an observable later generated TOD value by that other processor core, so the store control logic prevents this TOD value from being made visible to other processor cores. According to another embodiment, this can instead be done by delaying the storing of the timestamp to the shared memory for a minimum time granularity interval.

One or more embodiments provide uniqueness of timestamps by providing unique TOD values, while at the same time providing TOD values that increment when observed by a software program running on multiple cores of the system. In accordance with one or more embodiments, in one or more architectures, an instruction STCK ("Store clock") is used to store a TOD value to a memory location, and STCKE ("Store clock extended") to store an extended clock value to a memory location.

In accordance with one or more embodiments, to allow fast generation of TOD values, each processor core can include its own local copy of the TOD. Further, all TOD copies can be running in lockstep. Uniqueness can be provided by putting a core ID in the value stored by STCK. For example, a system with two cores and a 64-bit TOD value can be provided. The system's core 1 can store the actual TOD in bits 0:62 of memory location A and a 1 (one) in bit 63. A system's core 0 would store the actual TOD in bits 0:62 of memory location B and the value 0 (zero) in bit 63. If the TODs in both cores run in lockstep, this provides that they never store the same value, as long as STCK cannot happen faster than the TOD increments.

However, as more cores are added to the system the time resolution of the TOD may not be high enough to provide uniqueness. For example, using a fixed-width bit field for the TOD, e.g. 64 bits, and a guaranteed time increment in a certain bit position, e.g. 1 microsecond in bit 51, and having many processor cores in a system, e.g. 256, the remaining resolution of the TOD is not high enough to guarantee that STCK cannot happen faster than a TOD increment. Thus, two STCK executions on different cores at the same time would result in TOD values with only the core ID being different. Accordingly, it would depend on which core is compared to whom as to whether the TOD is incremented or decremented.

In accordance with one or more embodiments, this is solved by, instead of stalling the STCK, the other core is stalled if it wants to read the data created by the STCK. This is done by preventing the memory update done by the STCK to become visible to other processor cores as long as that could potentially lead to them observing a "newer" TOD value than a locally generated one. In accordance with an embodiment, the difference is that the execution of the instruction is not delayed. Instead, only the update of memory that is shared between processor cores is delayed. Further, according to one or more embodiments, if no other core wants to read from that memory location before a new TOD increment happens, and enough store buffer space exists, no execution stall is necessary at all.

Turning now to the figures, in FIG. 1 a system (100) for generating a timestamp without processor core execution stall is shown: The system (100) includes several processor cores (110), (120), (130) connected to a shared memory subsystem (150). The shared memory subsystem (150) can be main memory. According to another embodiment, the shared memory subsystem (150) can be, for a system with many processor cores, a multi-level cache hierarchy. For core (110), the parts in accordance with one or more embodiments are shown: Specifically, a TOD unit (111) generates TOD values. According to an embodiment, all TOD units in the system can run in sync. The processor core (110) also includes an execution control (113) that is responsible for instruction execution. Further, the core (110) includes a store subsystem (112) that handles all stores and coherency protocols between the processor core (110) and the shared memory subsystem (150).

Further, and according to one or more embodiments, upon execution of a STCK instruction, TOD unit (111) is asked by use of the STCK signal (114) to send the current TOD value over bus (116) to the store subsystem (112). The Store address (115) is also sent to the store subsystem (112). Store subsystem (112) associates the store address with the store data, i.e. the TOD value. Additionally, the TOD unit (111) indicates through a tick pending indication (117) if a STCK was done, but no TOD increment happened since the last STCK.

Figure 2:
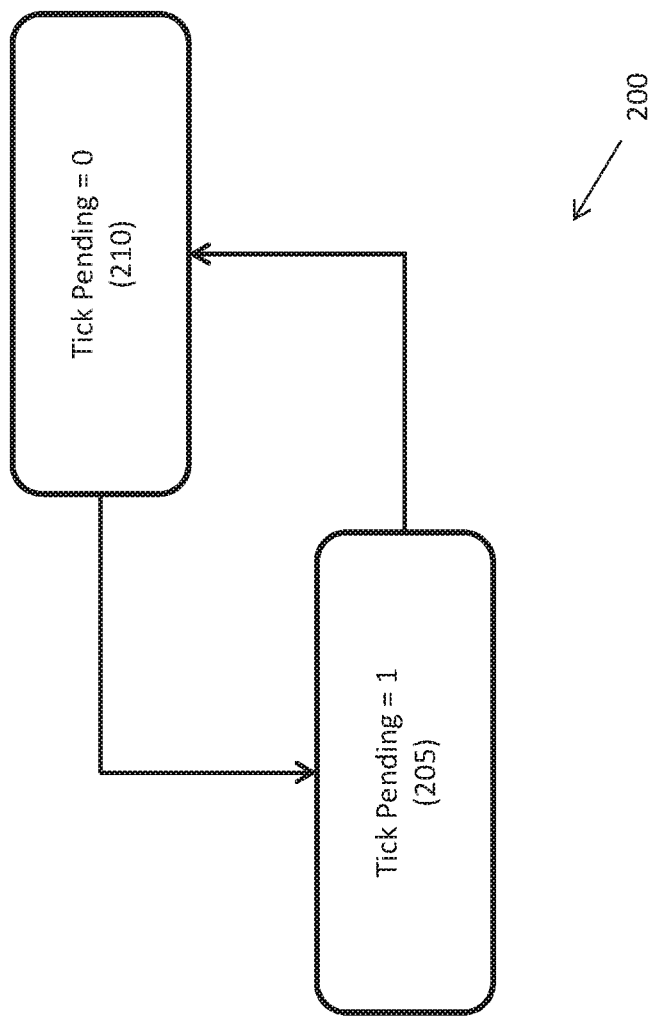
FIG. 2 is a state diagram of a least significant time bit of a timestamp in accordance with one or more embodiments.

Further, FIG. 2 illustrates a state diagram (200) of a least significant time bit of a timestamp in accordance with one or more embodiments. Specifically, the state diagram (200) shows a state diagram describing the tick pending (117) indication operation. As shown, as long as tick pending (117) is active (state 205), the store subsystem (112) makes sure that no store of the data is created by a STCK. According to another embodiment, as long as tick pending (117) is active (state 205), the store subsystem (112) makes sure that a stored value that is based on a value created by STCK cannot be accessed by any other processor core in the system. The state of the least significant time bit may transition from the active state (state 205) to the state where the tick pending is inactive (state 210). When the tick pending (117) is inactive (state 210) the store subsystem (112) can store the data created for other cores to access, or in another embodiment, can update the permissions of the location to allow other core to access.

Figure 3:
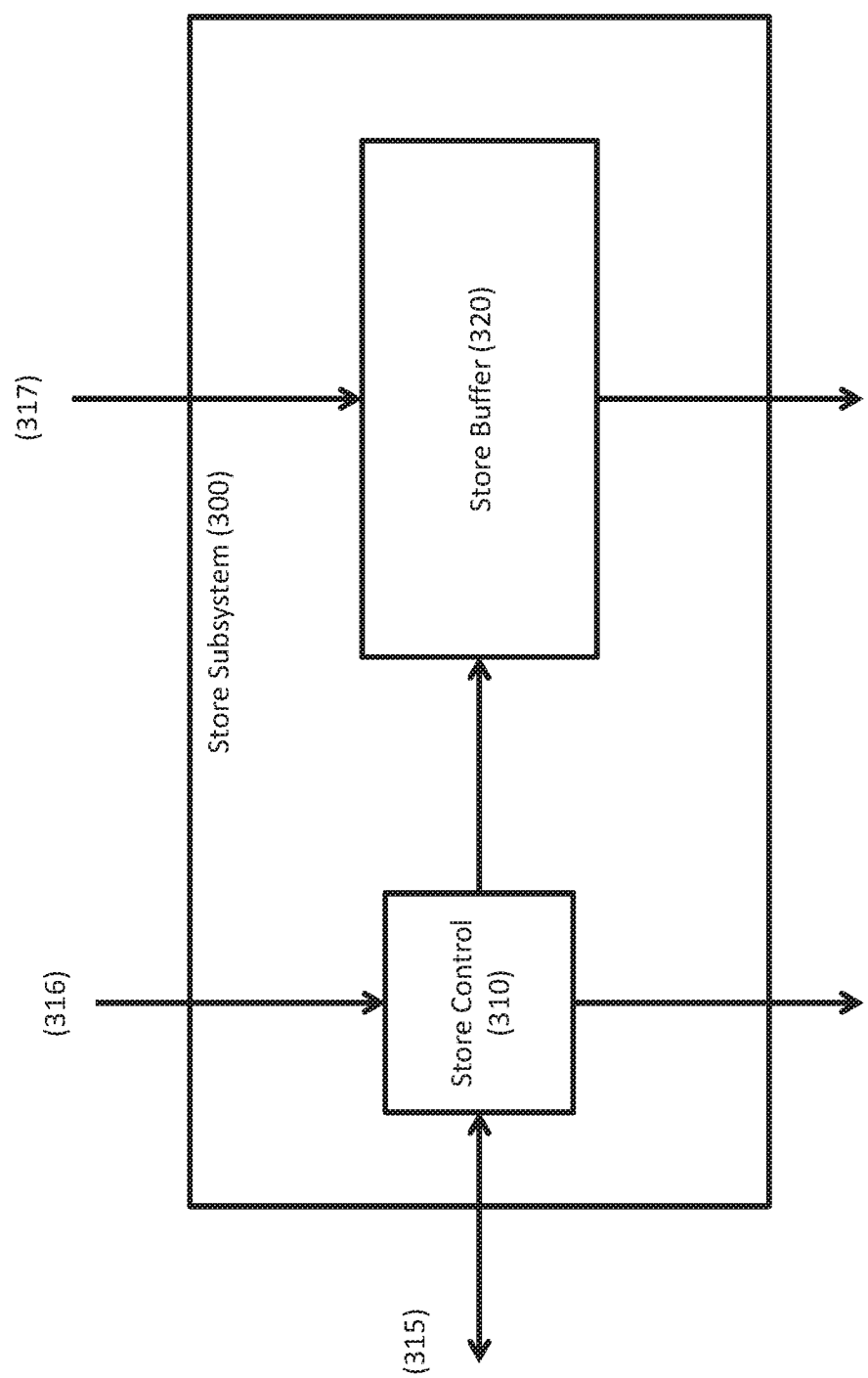
FIG. 3 is a block diagram of a store subsystem of a system for generating a timestamp without processor core execution stall in accordance with one or more embodiments.

FIG. 3 is a block diagram of a store subsystem (300) of a system for generating a timestamp without processor core execution stall. The store subsystem (300) is similar to the store subsystem (112) of FIG. 1. Further, the store subsystem (300) includes a store buffer (320) that stores an address and data of all stores before they are forwarded to the shared memory subsystem. The address and data of a STCK instruction are received through interfaces (315) and (316) respectively. According to other embodiments, other interfaces could also feed store addresses and data generated by operations other than STCK.

Further, according to one or more embodiments, the flow of stores is controlled by a store control (310) that interfaces with an execution control and handles the memory coherency interfaces between the processor core and the shared memory subsystem. Store control (310) also receives the tick pending indication (317). According to one embodiment, when tick pending (317) is not set, the store control (310) allows normal store flow if no other conditions from the execution control prevent stores from being sent to the shared memory subsystem. According to an embodiment, eventually all stores will be sent and the updated memory can be accessed by other cores. Alternatively, if the tick pending indication (317) is set, in a simple implementation, sending stores to the shared memory can be disallowed.

According to an embodiment, following normal coherency rules, before another core can access the memory address that received the TOD value, it has to request access to that address through the coherency interface. Store control will compare the requested address against all addresses currently in the store buffer. If the address is found there, i.e. there is still a store to that address pending; the access request of the other core will be rejected. That way, the other core cannot get the value stored by the STCK until tick pending indication (117) is cleared, which happens only when observing the value stored by STCK is guaranteed to not violate the strictly monotonic property of the TOD.

According to another embodiment, if the store buffer (320) is implemented as a queue, an optimized implementation will not simply stall all stores, but remember at what point in the store queue the STCK-store was added. This could e.g. be done by remembering the write pointer for that entry, and preventing only that entry and any entries for later stores from being sent out while tick pending (317) is set, using appropriate compares between the remembered write pointer and the position of a store in the store queue.

According to another embodiment, if the store buffer (320) is not implemented as a queue, i.e. stores in the store buffer are not stored sequentially relative to when they were written into the store buffer, an additional "Mark" field can be included that is associated with each store buffer entry. The "Mark" field can be used to mark any store starting with the STCK-store while tick pending (317) is set. That way, only "marked" stores will not be allowed to drain from the store buffer. All "Marks" are cleared when tick pending drops.

Figure 4:
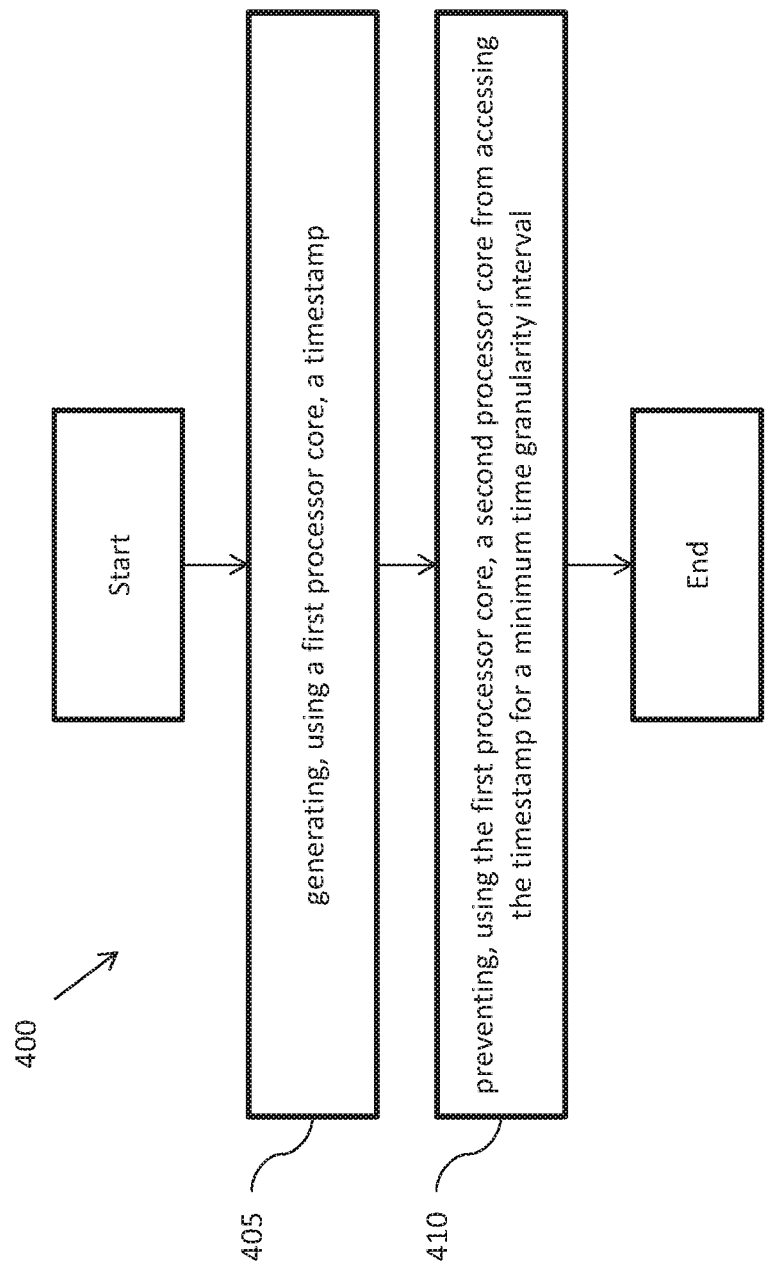
FIG. 4 is a flowchart of a method of generating a timestamp without processor core execution stall in accordance with one or more embodiments.

FIG. 4 is a flowchart of a method 400 of generating a timestamp without processor core execution stall in accordance with one or more embodiments. The method 400 includes generating, using a first processor core, a timestamp (operation 405). The method 400 also includes preventing, using the first processor core, a second processor core from accessing the timestamp for a minimum time granularity interval (operation 410).

Figure 5:
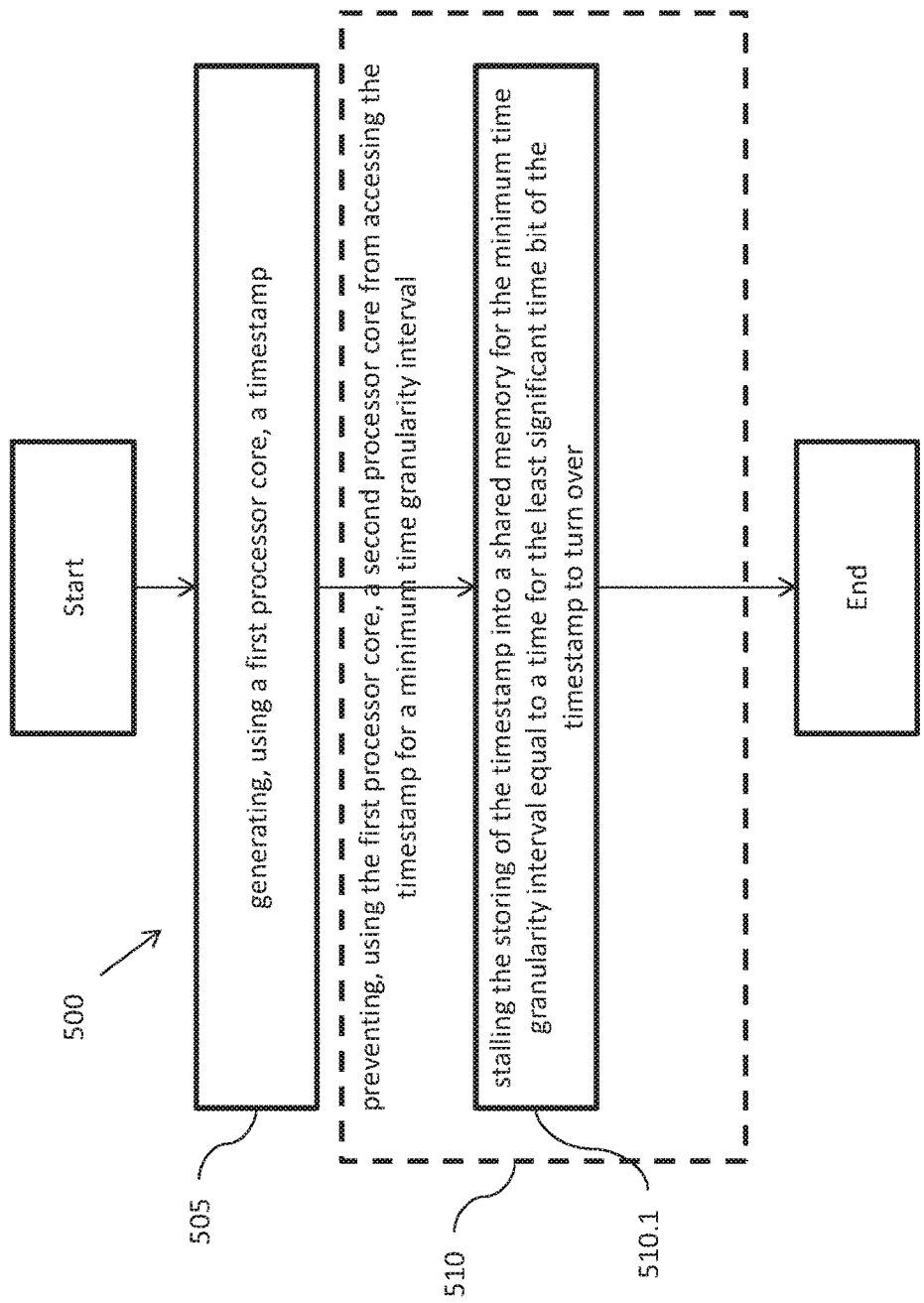
FIG. 5 is a flowchart of a method of generating a timestamp without processor core execution stall that includes stalling in accordance with one or more embodiments.

FIG. 5 is a flowchart of a method 500 of generating a timestamp without processor core execution stall that includes stalling in accordance with one or more embodiments. The method 500 includes generating, using a first processor core, a timestamp (operation 505). The method 500 also includes preventing, using the first processor core, a second processor core from accessing the timestamp for a minimum time granularity interval (operation 510). Further, preventing the second process core from accessing the timestamp can specifically include stalling the storing of the timestamp into a shared memory for the minimum time granularity interval equal to a time for the least significant time bit of the timestamp to turn over (operation 510.1).

Figure 6:
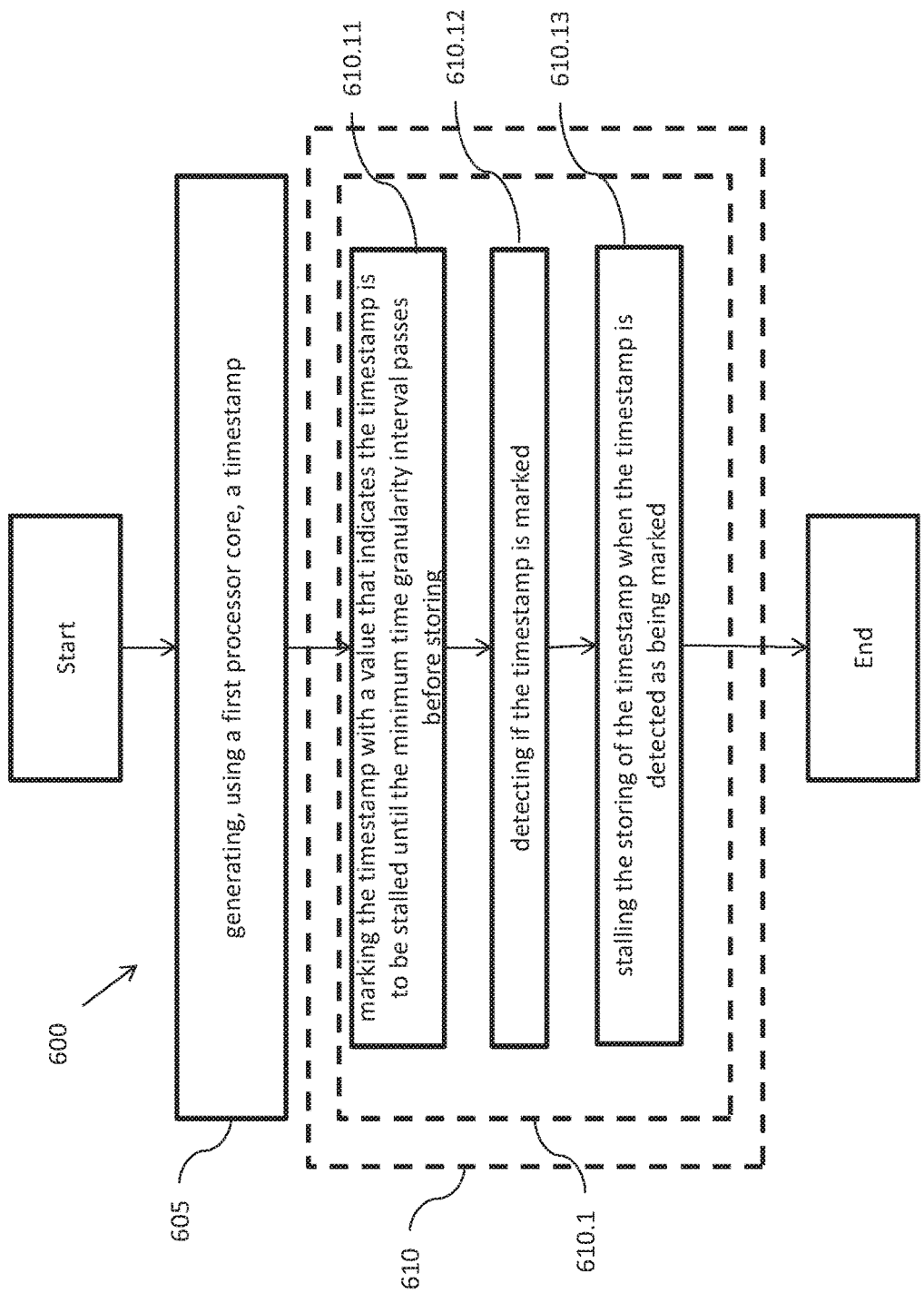
FIG. 6 is a flowchart of a method of generating a timestamp without processor core execution stall that includes marking, detecting, and stalling in accordance with one or more embodiments.

FIG. 6 is a flowchart of a method 600 of generating a timestamp without processor core execution stall that includes marking, detecting, and stalling in accordance with one or more embodiments. The method 600 includes generating, using a first processor core, a timestamp (operation 605). The method 600 also includes preventing, using the first processor core, a second processor core from accessing the timestamp for a minimum time granularity interval (operation 610). Further, preventing the second process core from accessing the timestamp can specifically include stalling the storing of the timestamp into a shared memory for the minimum time granularity interval equal to a time for the least significant time bit of the timestamp to turn over (operation 610.1). Stalling can be done by implementing a number of different operations. For example, according to one or more embodiments, stalling includes marking the timestamp with a value that indicates the timestamp is to be stalled until the minimum time granularity interval passes before storing (operation 610.11), detecting if the timestamp is marked (operation 610.12), and stalling the storing of the timestamp when the timestamp is detected as being marked (operation 610.13).

Figure 7:
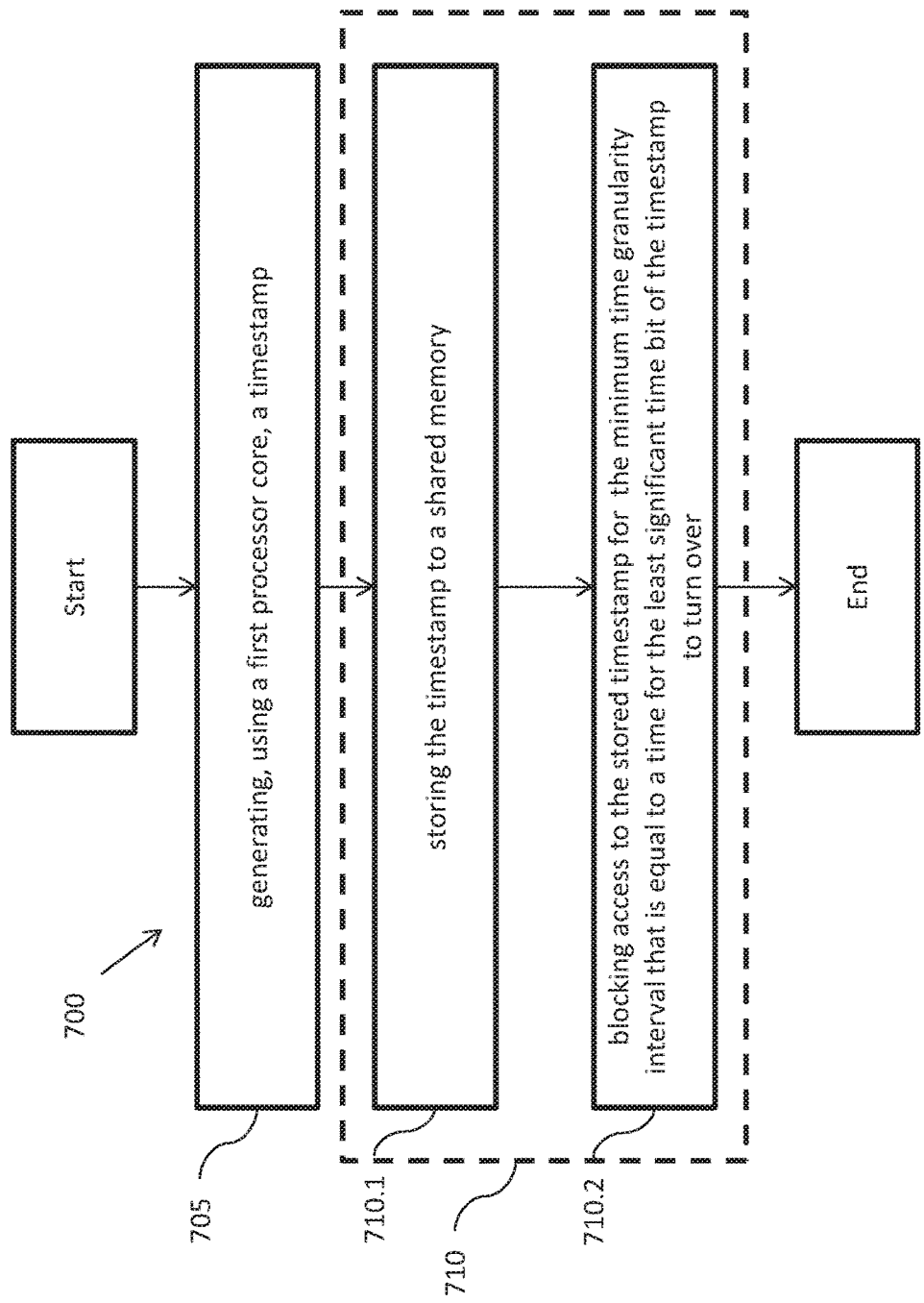
FIG. 7 is a flowchart of a method of generating a timestamp without processor core execution stall that includes storing and blocking in accordance with one or more embodiments.

FIG. 7 is a flowchart of a method 700 of generating a timestamp without processor core execution stall that includes storing and blocking in accordance with one or more embodiments. The method 700 includes generating, using a first processor core, a timestamp (operation 705). The method 700 also includes preventing, using the first processor core, a second processor core from accessing the timestamp for a minimum time granularity interval (operation 710). Further, preventing the second process core from accessing the timestamp can specifically include storing the timestamp to a shared memory (operation 710.1) and blocking access to the stored timestamp for the minimum time granularity interval that is equal to a time for the least significant time bit of the timestamp to turn over (operation 710.2).

Figure 8:
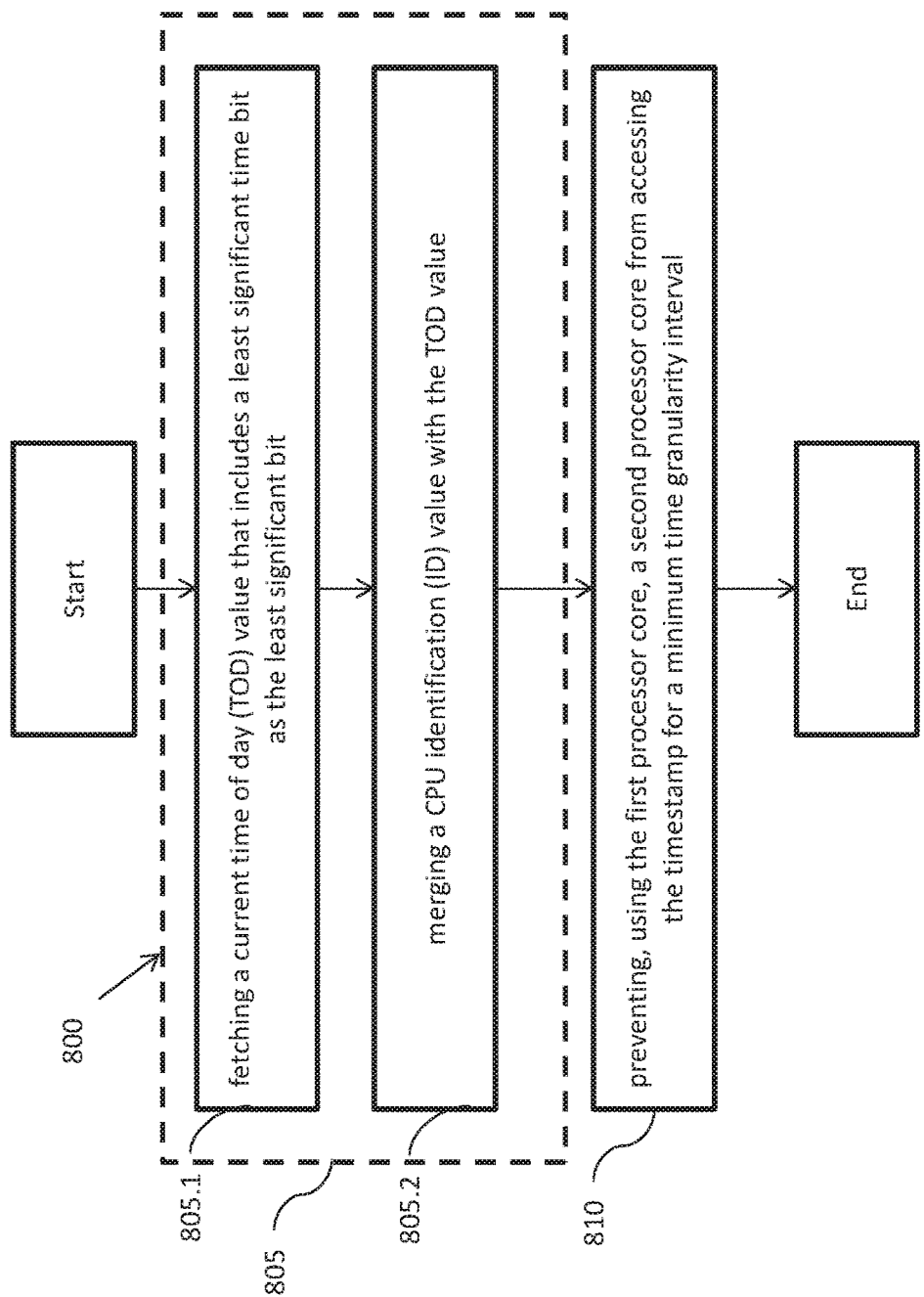
FIG. 8 is a flowchart of a method of generating a timestamp without processor core execution stalls that including fetching and merging in accordance with one or more embodiments.

FIG. 8 is a flowchart of a method 800 of generating a timestamp without processor core execution stalls that including fetching and merging in accordance with one or more embodiments. The method 800 includes generating, using a first processor core, a timestamp (operation 805). Generating the timestamp includes fetching a current time of day (TOD) value that includes a least significant time bit as the least significant bit (operation 805.1). Further, generating the timestamp also includes merging a CPU identification (ID) value with the TOD value (operation 805.2). The method 800 also includes preventing, using the first processor core, a second processor core from accessing the timestamp for a minimum time granularity interval (operation 810).

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof.

Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method for generating a timestamp without processor core execution stall, the method comprising:
   generating, using a first processor core, a timestamp; and
   preventing, using the first processor core, a second processor core from accessing the timestamp for a minimum time granularity interval,
   wherein the time granularity interval provides a delay such that the timestamp generated by the first processor core is earlier in time than a second processor core timestamp.

2. The method of claim 1,
   wherein the minimum time granularity interval is equal to a time for the least significant time bit of the timestamp to turn over.

3. The method of claim 1, wherein preventing the second processor core from viewing the timestamp comprises:
   stalling a storing of the timestamp into a shared memory for the minimum time granularity interval equal to a time for the least significant time bit of the timestamp to turn over.

4. The method of claim 1, wherein preventing the second processor core from viewing the timestamp comprises:
   storing the timestamp to a shared memory; and
   blocking access to a stored timestamp for the minimum time granularity interval that is equal to a time for the least significant time bit of the timestamp to turn over.

5. The method of claim 4, wherein blocking access to the stored timestamp comprises:
   holding ownership of a shared memory location that has the generated timestamp until the minimum time granularity interval passes.

6. The method of claim 1, further comprising:
   retrieving, at a second processor core, the timestamp generated and stored by the first processor core.

7. The method of claim 3, wherein stalling the storing of the timestamp comprises:
   marking the timestamp with a value that indicates the timestamp is to be stalled until the minimum time granularity interval passes before storing;
   detecting if the timestamp is marked; and
   stalling the storing of the timestamp when the timestamp is detected as being marked.

8. The method of claim 7, further comprising:
   removing the marking when the minimum time granularity interval passes.

9. The method of claim 1,
   wherein the first processor core continues executing during the minimum time granularity interval.

10. The method of claim 1, wherein generating the timestamp comprises:
    fetching a current time of day (TOD) value that includes a least significant time bit as a least significant bit; and
    merging a CPU identification (ID) value with the TOD value.

11. The method of claim 10, wherein merging the CPU ID value with the TOD value, further comprises:
    appending the CPU ID value bits to the TOD value as the least significant bits.

12. The method of claim 11,
    wherein the minimum time granularity interval is equal to the time is takes for the least significant bit of the TOD value to turn over.

13. A system for generating a timestamp without processor core execution stall, the system comprising:
    a shared memory having computer readable instructions; and
    a first processor core configured to execute the computer readable instructions, the computer readable instructions comprising:
    generating, using the first processor core, a timestamp;
    preventing, using the first processor core, a second processor core from accessing the timestamp for a minimum time granularity interval; and
    retrieving, at the second processor core, the timestamp generated and stored by the first processor core after the minimum time granularity interval passes,
    wherein the minimum time granularity interval is equal to a time for the least significant time bit of the timestamp to turn over.

14. The system of claim 13, wherein preventing the second processor core from viewing the timestamp comprises:
    stalling a storing of the timestamp into the shared memory for the minimum time granularity interval equal to a time for the least significant time bit of the timestamp to turn over.

15. The system of claim 13, wherein preventing the second processor core from viewing the timestamp comprises:
    storing the timestamp to the shared memory; and
    blocking access to a stored timestamp for the minimum time granularity interval that is equal to a time for the least significant time bit of the timestamp to turn over by holding ownership of a shared memory location that has the generated timestamp until the minimum time granularity interval passes.

16. The system of claim 14, wherein stalling the storing of the timestamp comprises:
    marking the timestamp with a value that indicates the timestamp is to be stalled until the minimum time granularity interval passes before storing;
    detecting if the timestamp is marked;
    stalling the storing of the timestamp when the timestamp is detected as being marked; and
    removing the marking when the minimum time granularity interval passes.

17. The system of claim 13, wherein generating the timestamp comprises:
    fetching a current time of day (TOD) value that includes a least significant time bit as a least significant bit; and merging a CPU identification (ID) value with the TOD value by appending the CPU ID value bits to the TOD value as the least significant bits, wherein the minimum time granularity interval is equal to the time is takes for the least significant bit of the TOD value to turn over.

18. A computer program product for generating a timestamp without processor core execution stall, the computer program product comprising a non-transitory computer readable storage medium having program instructions embodied therewith, the program instructions executable by a plurality of processor cores that includes a first processor core and a second processor core to cause the plurality of processor cores to:

generate, using the first processor core, a timestamp;

prevent, using the first processor core, a second processor core from accessing the timestamp for a minimum time granularity interval; and retrieve, at the second processor core, the timestamp generated and stored by the first processor core after the minimum time granularity interval passes, wherein the minimum time granularity interval is equal to a time for the least significant time bit of the timestamp to turn over.

19. A computer program product of claim 18 further comprising additional program instructions executable by the first processor core to cause the first processor core to:

stalling the storing of the timestamp into a shared memory for the minimum time granularity interval equal to a time for the least significant time bit of the timestamp to turn over.

20. A computer program product of claim 18 further comprising additional program instructions executable by the first processor core to cause the first processor core to:

storing the timestamp to the shared memory; and blocking access to the stored timestamp for the minimum time granularity interval that is equal to a time for the least significant time bit of the timestamp to turn over by holding ownership of a shared memory location that has the generated timestamp until the minimum time granularity interval passes.

\* \* \* \* \*